(12) United States Patent
Duval-Arnould et al.

(10) Patent No.: US 9,368,047 B2
(45) Date of Patent: Jun. 14, 2016

(54) SIMULATION ADD-ON DEVICE TO ALLOW ANTERIOR-POSTERIOR AND/OR ANTERIOR-LATERAL DEFIBRILLATION

(71) Applicant: The Johns Hopkins University, Baltimore, MD (US)

(72) Inventors: Jordan Duval-Arnould, Baltimore, MD (US); Julie Campbell, Baltimore, MD (US); Elizabeth Hunt, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 74 days.

(21) Appl. No.: 14/258,216

(22) Filed: Apr. 22, 2014

(65) Prior Publication Data
US 2014/0315173 A1    Oct. 23, 2014

Related U.S. Application Data

(60) Provisional application No. 61/814,548, filed on Apr. 22, 2013.

(51) Int. Cl.
*G09B 23/28* (2006.01)
(52) U.S. Cl.
CPC ............. *G09B 23/288* (2013.01); *G09B 23/28* (2013.01)
(58) Field of Classification Search
CPC .............................. G09B 23/28; G09B 23/288
USPC .................................................. 434/262, 265
See application file for complete search history.

(56) References Cited

U.S. PATENT DOCUMENTS

| | | | | |
|---|---|---|---|---|
| 5,137,458 A * | 8/1992 | Ungs | ............... | G09B 23/288 434/262 |
| 5,611,815 A * | 3/1997 | Cole | ............... | A61N 1/39 607/5 |
| 5,993,219 A * | 11/1999 | Bishay | ............... | A61N 1/046 434/265 |
| 6,336,047 B1 * | 1/2002 | Thu | ............... | A61N 1/046 434/265 |
| 7,510,398 B1 * | 3/2009 | Thornton | ............... | G09B 23/288 434/262 |
| 2003/0036044 A1 * | 2/2003 | Pastrick | ............... | G09B 23/288 434/265 |
| 2006/0069326 A1 * | 3/2006 | Heath | ............... | A61H 31/005 601/41 |
| 2009/0029332 A1 * | 1/2009 | Solosko | ............... | G09B 23/288 434/265 |
| 2012/0158074 A1 * | 6/2012 | Hall | ............... | A61B 5/024 607/5 |
| 2013/0330698 A1 * | 12/2013 | Yang | ............... | G09B 23/288 434/265 |
| 2014/0004494 A1 * | 1/2014 | Griesser | ............... | A61N 1/3993 434/267 |

\* cited by examiner

*Primary Examiner* — Xuan Thai
*Assistant Examiner* — Kristen Shirley
(74) *Attorney, Agent, or Firm* — Johns Hopkins Technology Ventures

(57) ABSTRACT

The present invention takes the form of a device for training a user in defibrillation technique. The device includes a non-conductive belt that encircles a chest of a typical training simulator. The device includes conductive studs disposed in the AP or AL position, and therefore allows for training of the AP or AL defibrillation technique, respectively. The device can be used in conjunction with a high-technology simulator. In such a case the conductive studs redirect simulated cardiac rhythm signals and defibrillator electricity, allowing for the simulation of defibrillation in the AP position. The device can also be used in conjunction with a low-technology simulator or a pillow to provide AP and/or AL defibrillation functionality. In such a case, a rhythm simulator is used to simulate heart rhythm and dissipate defibrillation energy.

18 Claims, 4 Drawing Sheets

SIMULATION ADD-ON DEVICE TO ALLOW ANTERIOR-POSTERIOR AND/OR ANTERIOR-LATERAL DEFIBRILLATION

CROSS-REFERENCE TO RELATED APPLICATION

This application claims the benefit of U.S. Provisional Patent Application No. 61/814,548 filed on Apr. 22, 2013, which is incorporated by reference, herein, in its entirety.

FIELD OF THE INVENTION

The present invention relates generally to cardiac care training. More particularly, the present invention relates to a device for defibrillation training.

BACKGROUND OF THE INVENTION

Approximately 300,000 adults die annually due to out-of-hospital cardiac arrest in the United States. Survival rates of adult cardiac arrest range from 11-45%. Approximately 16,000 children in the United States experience cardiac arrest annually. In the pediatric intensive-care setting there is one cardiac arrest per 100 admissions and the survival-to-discharge rate for children following in-hospital cardiac arrest is a meager 27%. In the case of a cardiac arrest, providers are expected to treat the patient with immediate chest compressions and defibrillate the patient within 180 seconds, which are the two priorities in basic life support (BLS). Defibrillation is the application of the therapeutic dose of electrical energy through a cardiac arrest patient's heart to depolarize the muscle and return heart to normal sinus rhythm. Anterior-lateral (AL) defibrillator pad placement, as illustrated in FIG. 1A, is the standard pad placement; however, anterior-posterior (AP) pad placement, as illustrated in FIG. 1B, is becoming common practice in pediatric BLS due to defibrillator manufacturer recommendations, which ultimately drive hospital protocol. It has been observed at medical institutions that pediatric nurses often place pads on patients in the AP position. Thus, there is a strong need to train and practice AP pad placement.

Simulation-based training can be an effective method of improving quality of cardiopulmonary resuscitation (CPR) and BLS. Healthcare providers for both pediatric and adult patients with hands-on experience with a defibrillator are 87% more likely to successfully defibrillate in a given period of time. Evidence increasingly suggests that training using high-technology simulators results in significant performance advantages for learners in comparison with low-technology simulators. American Heart Association (AHA) requirements for BLS training courses involve online lessons to be completed individually, and then interactive classes with an instructor for skills practice and testing, both of which involve the use of simulation-based training. The current methods of teaching BLS are inadequate because the majority of simulators used for standard BLS training to out-of-hospital providers offer no defibrillation capability, which limits the amount of the hands-on learning that can take place in adult and pediatric BLS courses. Although there are some courses that do include high-technology simulators in training, there are currently few simulators that allow for defibrillation with AP pad placement. This gap in hands-on training could lead to ineffective training of pediatric BLS and confusion in the field.

It is therefore desirable to provide a device for training of current methods of BLS that is affordable and compatible with current simulators and clinical defibrillators.

SUMMARY OF THE INVENTION

The foregoing needs are met, to a great extent, by the present invention, wherein in one aspect a device for AP defibrillation training includes a non-conductive belt configured to wrap around a defibrillation simulator. Conductive studs are configured to transmit a defibrillation signal.

In accordance with an aspect of the present invention, the simulator can take the form of a high-technology simulator. In such a case, the existing conductive studs positioned for AL defibrillation are wired to transmit a defibrillation signal to the AP defibrillation contacts on the device. Alternatively, the device can be used with low-technology simulators to add defibrillation contacts in the AP and/or AL positions. In this configuration, a rhythm simulator is used with the device. Additional contacts provided by this device in all use cases can be used to train defibrillation with clinical defibrillator pads and clinically-relevant therapeutic defibrillation energy amplitudes.

In accordance with an aspect of the present invention, a system for defibrillation training includes a high-technology defibrillation simulator. The system also includes a non-conductive belt configured to wrap around the high-technology defibrillation simulator. Additionally, the system includes conductive studs to transmit a defibrillation signal.

In accordance with yet another aspect of the present invention, the conductive studs are positioned in the AL position to transmit a defibrillation signal to the AP conductive studs. The system includes a display. The system can also include defibrillator pads.

In accordance with yet another aspect of the present invention, a system for defibrillation training includes a low-technology defibrillation simulator. The system includes a non-conductive belt configured to wrap around the low-technology defibrillation simulator. Additionally, the system includes conductive studs to transmit a defibrillation signal and a rhythm simulator.

In accordance with still another aspect of the present invention, the rhythm simulator is incorporated into the non-conductive belt. The rhythm simulator can also take the form of a stand-alone component. The low-technology defibrillation simulator can take a form of a pillow. The low-technology defibrillation simulator can also take a form of a simulator substitute. The system includes defibrillator pads. The system can include a display, and the display can be incorporated into the rhythm simulator. The system can also include an analogue signal traveling through conductive studs via attachment of the defibrillator pads to the studs and attachment of the rhythm simulator.

BRIEF DESCRIPTION OF THE DRAWINGS

The accompanying drawings provide visual representations which will be used to more fully describe the representative embodiments disclosed herein and can be used by those skilled in the art to better understand them and their inherent advantages. In these drawings, like reference numerals identify corresponding elements and.

DETAILED DESCRIPTION

The presently disclosed subject matter now will be described more fully hereinafter with reference to the accompanying Drawings, in which some, but not all embodiments of the inventions are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated Drawings. Therefore, it is to be understood that the presently disclosed subject matter is not to be limited to the specific embodiments disclosed and that modifications and other embodiments are intended to be included within the scope of the appended claims.

The present invention takes the form of a device for training a user in AP and/or AL defibrillation technique. The device includes a non-conductive belt that encircles a chest of a typical defibrillation training simulator. The device includes conductive contacts disposed in the AP or AL position, and therefore allows for training of the AP or AL defibrillation technique, respectively. The device can be used in conjunction with a high-technology simulator. In such a case the conductive studs redirect simulated cardiac rhythm signals and defibrillator electricity, allowing for the defibrillation of high-technology simulators in the AP position. The device can also be used in conjunction with a low-technology simulator or a pillow. In such a case, a rhythm simulator is used to generate the heart rhythm that is collected by the defibrillator electrodes when connected to conductive contacts. The rhythm simulator will also dissipate the shock when the low-technology simulator is defibrillated.

Figure 1A:
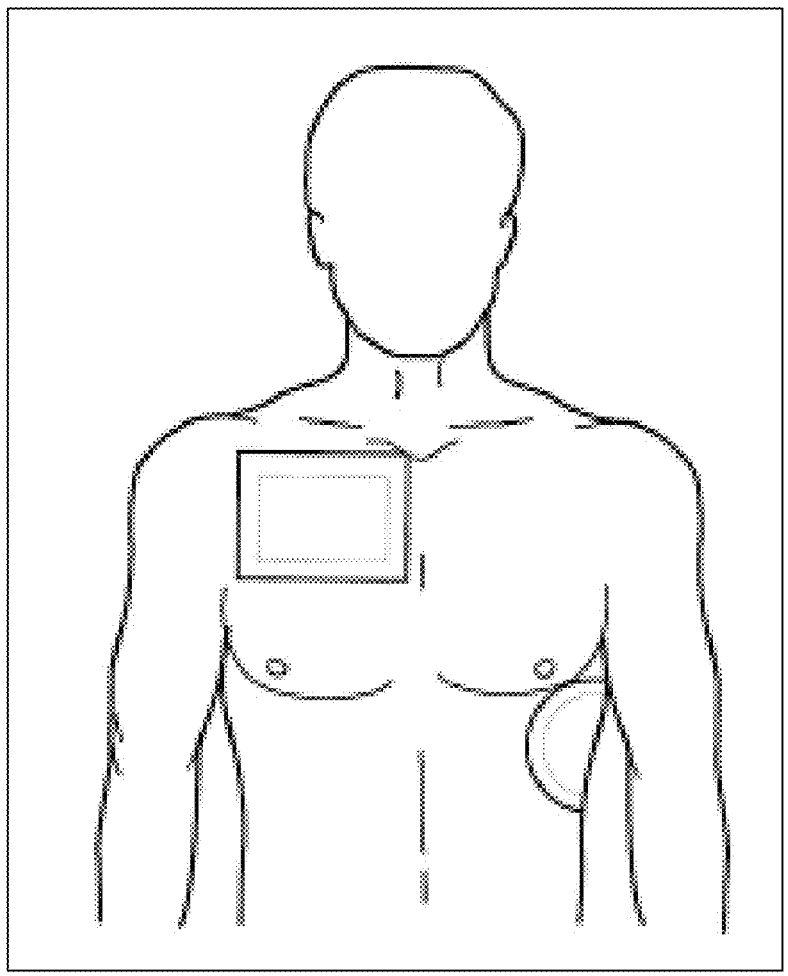
FIG. 1A illustrates a diagram of anterior-lateral (AL) defibrillator pad placement.
Figure 1B:
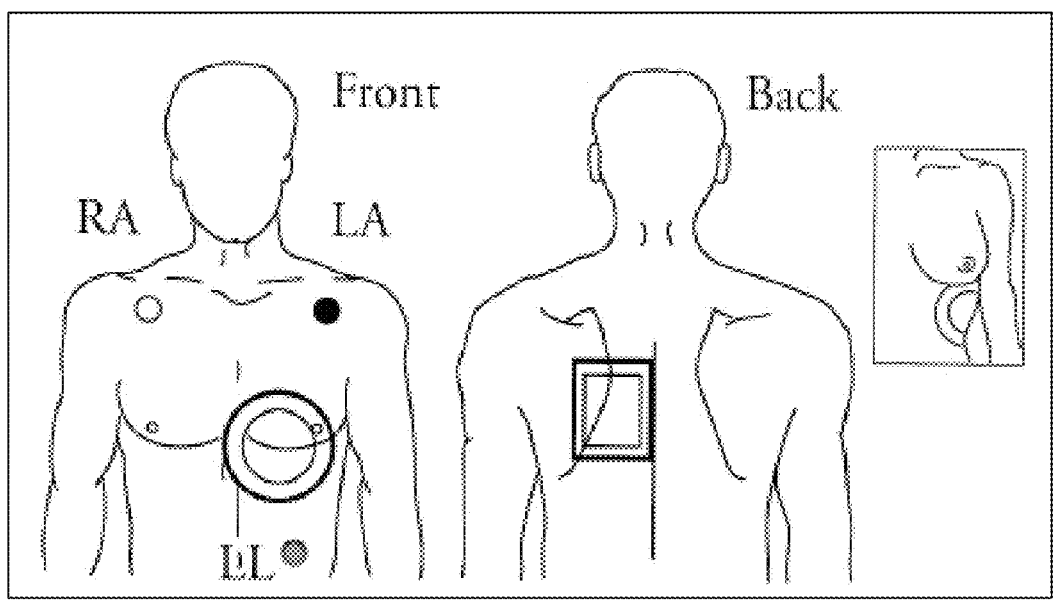
FIG. 1B illustrates a diagram of anterior-posterior (AP) defibrillator pad placement.
Figure 2A:
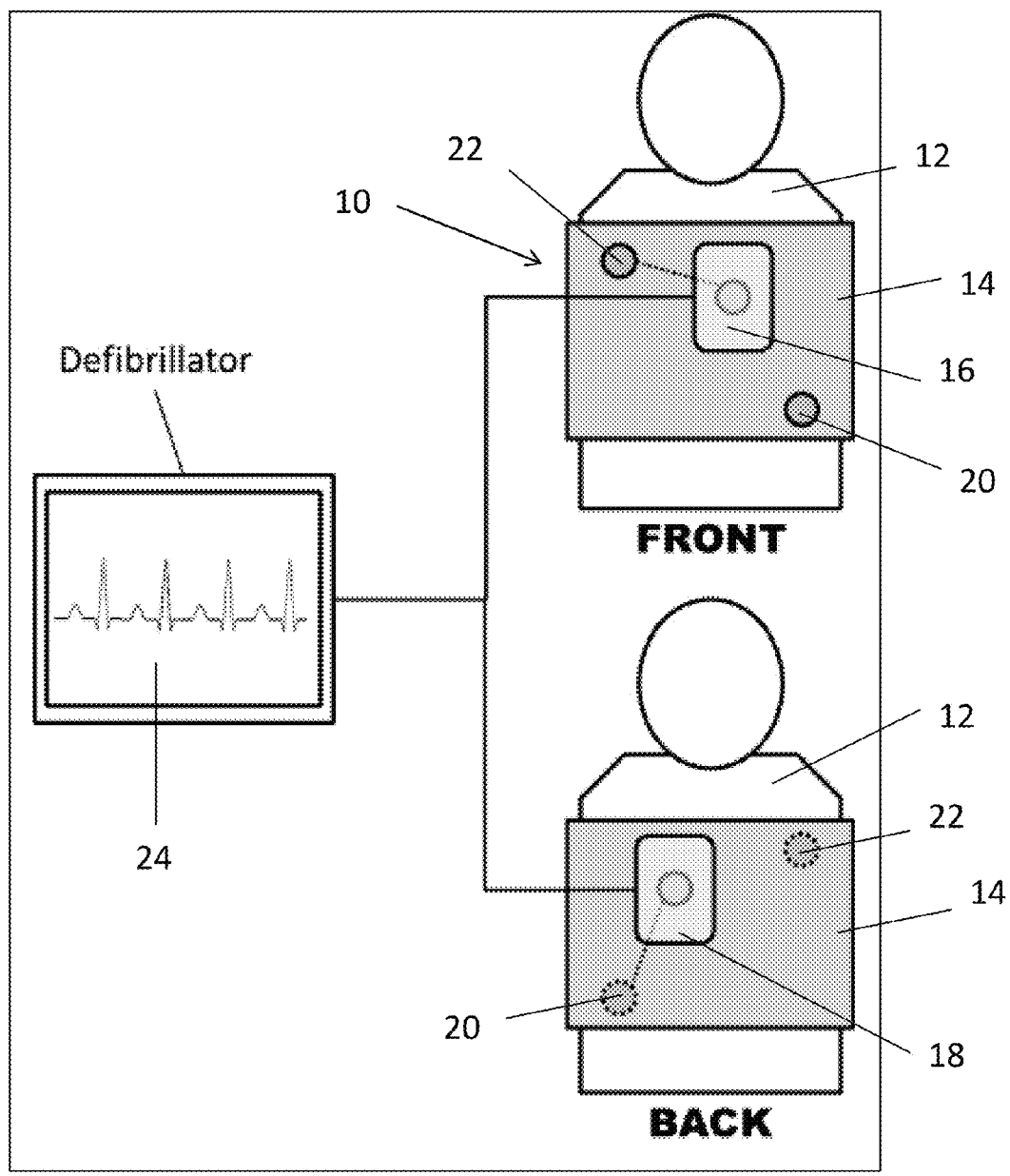
FIG. 2A illustrates a schematic diagram of a device according to an embodiment of the present invention in use with a high-technology defibrillation simulator.

FIG. 2A illustrates a schematic diagram of a defibrillation training device, according to an embodiment of the present invention. The device 10 illustrated in FIG. 2A is configured for use with a high-technology simulator 12. Most high-technology simulators already in use have AL defibrillation functionality, but not AP defibrillation functionality. Therefore, the device 10 of the present invention allows for training AP defibrillation using the AL functionality. As illustrated in FIG. 2A, the device 10 includes a non-conductive belt 14. Defibrillator pads 16, 18 are configured to be positioned in the AP position over conductive contacts. Existing conductive contacts in the AL position 20, 22 are connected with conductive contacts in the AP position on the device, redirecting the simulated cardiac rhythm signals and defibrillator electricity to the AP conductive contacts. A clinical defibrillator or monitor 24 shows the simulated cardiac rhythm and a defibrillation event.

Figure 2B:
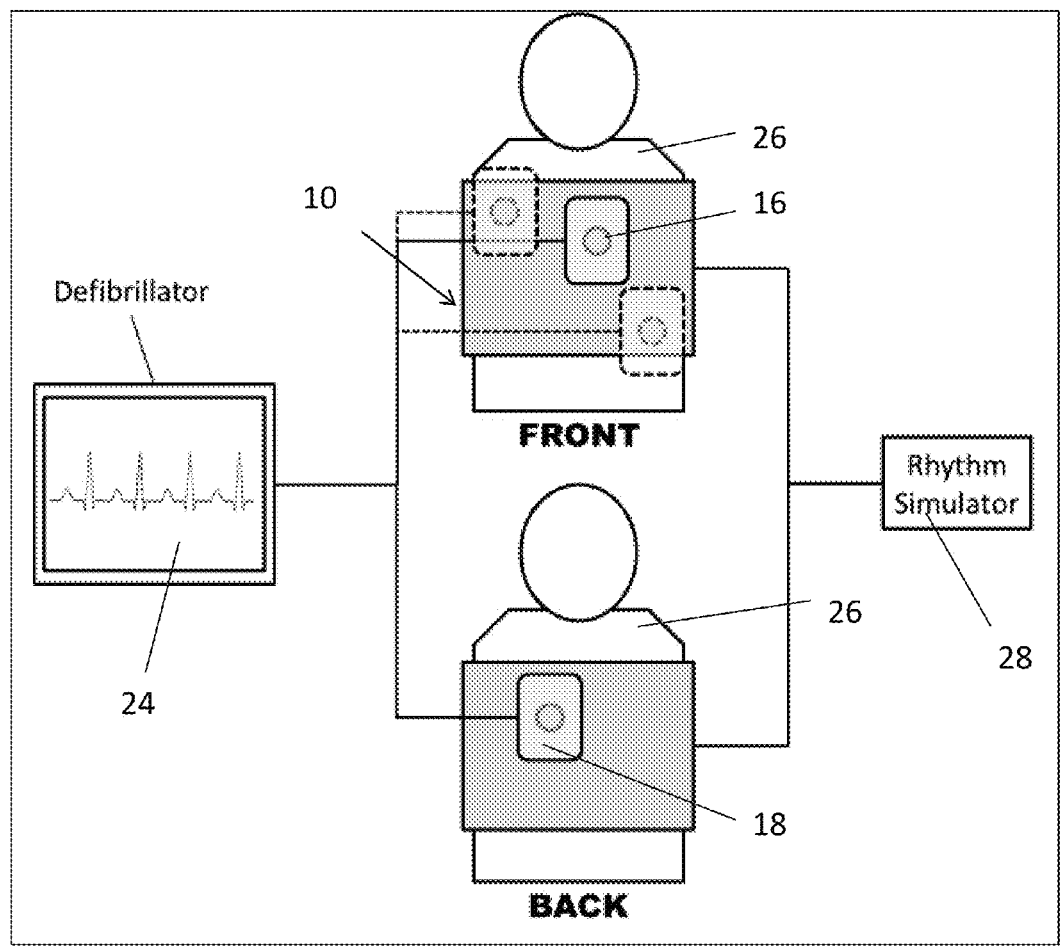
FIG. 2B illustrates a schematic diagram of a device according to an embodiment of the present invention in use with a low-technology defibrillation simulator.

FIG. 2B illustrates a schematic diagram of a device for defibrillation training, according to the present invention. The device 10, as illustrated in FIG. 2B, is configured for use with a low-technology simulator or simulator substitute, such as a pillow 26. As illustrated in FIG. 2B, the device 10 includes the non-conductive belt 14. Defibrillator pads 16, 18 are positioned in the AP position over conductive contacts or in the AL position over conductive contacts (dotted lines). Because the low-technology simulator 26 does not have the functionality to be defibrillated in any position, the device 10 directs the signal to an external rhythm simulator 28. The clinical defibrillator or monitor 24 shows the simulated rhythm and a defibrillation event. If a low-technology simulator or other simulator substitute is being used, the rhythm simulator 28 must be connected or activated for a complete training experience. The rhythm simulator 28 may be integrated into the non-conductive belt 14 or alternately, a separate component of a system for defibrillation training.

More particularly, the present invention is a non-conductive belt that encircles the simulator chest. When used with high-technology simulators, which have AL defibrillation functionality, the device redirects simulated cardiac rhythm signals and defibrillator electricity via conductive studs in the AL position, allowing for defibrillation in the AP position, as illustrated in FIG. 2A. This device can also be used with low-technology simulators or simulator substitutes, such as a pillow, neither of which have the functionality to be defibrillated in any position. When used with these non-defibrillatable simulators, the device directs the signal flow between an external rhythm simulator and the defibrillator, as illustrated in FIG. 2B. Analogue signal flow travels through the conductive studs in the AP or AL position via attachment of the electrode pads to the studs and attachment of the device to the rhythm simulator, allowing for interchangeable AP and AL defibrillation functionality.

This device is a non-conductive belt that encircles the simulator chest. The device redirects simulated cardiac rhythm signals and defibrillator electricity via conductive studs in the AP position. When used with a high-technology simulator (HTS), the device allows for cardiac rhythm signal flow from the simulator's existing AL contact points (which become concealed) to the AP device studs. When used with a low-technology simulator (LTS), the signal flow between an external rhythm simulator and the defibrillator travels through the conductive studs in the AP position via attachment of the electrode pads to the studs and attachment of the device to the rhythm simulator.

Tests for safety and signal modification have been conducted. The device can safely conduct defibrillation shock and cardiac rhythm simulator electrical signals. Electricity up to 200 J with an impedance of approximately 70Ω was successfully delivered to the device; this is comparable to conductive/resistive characteristics of current HTS.

Using this device, HTS with AL functionality can be quickly and reversibly converted to be AP capable. In settings lacking HTS, this device can be used with stand-alone cardiac rhythm generators to teach/train AP defibrillation using LTS. Due to its portability, this device would be exceptionally useful in multiple settings in combination with any available simulator. The device instantly increases the capacity of HTS and provides a low-cost solution to providing realistic resuscitation training focusing on AP placement.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A device for defibrillation training comprising:
   a non-conductive belt configured to wrap around a simulator; and
   conductive studs to transmit a defibrillation signal wherein there are conductive studs positioned to simulate anterior-lateral (AL) position defibrillation and different conductive studs to simulate anterior-posterior (AP) position defibrillation.

2. The device of claim 1 wherein the simulator comprises a high-technology simulator.

3. The device of claim 2 wherein the conductive studs are positioned in an AL position and transmit a defibrillation signal to AP conductive studs.

4. The device of claim 1 wherein the defibrillation simulator comprises a low-technology simulator.

5. The device of claim 4 further comprising a rhythm simulator.

6. A system for defibrillation training comprising:
   a high-technology defibrillation simulator;
   a non-conductive belt configured to wrap around the high-technology defibrillation simulator; and
   conductive studs to transmit a defibrillation signal wherein there are conductive studs positioned to simulate anterior-lateral (AL) position defibrillation and different conductive studs to simulate anterior-posterior (AP) position defibrillation.

7. The system of claim 6 wherein the conductive studs are positioned in an AL position and transmit a defibrillation signal to AP conductive studs.

8. The system of claim 6 further comprising a display.

9. The system of claim 6 further comprising defibrillator pads.

10. A system for defibrillation training comprising:
    a low-technology defibrillation simulator;
    a non-conductive belt configured to wrap around the low-technology defibrillation simulator;
    conductive studs to transmit a defibrillation signal wherein there are conductive studs positioned to simulate anterior-lateral (AL) position defibrillation and different conductive studs to simulate anterior-posterior (AP) position defibrillation; and
    a rhythm simulator.

11. The system of claim 10 further comprising the rhythm simulator being incorporated into the non-conductive belt.

12. The system of claim 10 further comprising the rhythm simulator taking a form of a stand-alone component.

13. The system of claim 10 further comprising the low-technology defibrillation simulator taking a form of a pillow.

14. The system of claim 10 further comprising the low-technology defibrillation simulator taking a form of a simulator substitute.

15. The system of claim 10 further comprising defibrillator pads.

16. The system of claim 10 further comprising a display.

17. The system of claim 16 further comprising the display being incorporated into the rhythm simulator.

18. The system of claim 15 further comprising an analogue signal traveling through conductive studs via attachment of the defibrillator pads to the studs and attachment of the rhythm simulator.

* * * * *